(12) United States Patent
Springer et al.

(10) Patent No.: US 7,992,630 B2
(45) Date of Patent: Aug. 9, 2011

(54) SYSTEM AND METHOD FOR PRE-COOLING OF BUILDINGS

(75) Inventors: David A. Springer, Winters, CA (US);
Leo I. Rainer, Davis, CA (US)

(73) Assignee: Davis Energy Group, Inc., Davis, CA (US)

(*) Notice: Subject to any disclaimer, the term of this patent is extended or adjusted under 35 U.S.C. 154(b) by 1106 days.

(21) Appl. No.: 11/806,059

(22) Filed: May 29, 2007

(65) Prior Publication Data
US 2007/0227721 A1    Oct. 4, 2007

Related U.S. Application Data

(63) Continuation-in-part of application No. 09/802,883, filed on Mar. 12, 2001, now Pat. No. 7,398,821.

(51) Int. Cl.
G05D 23/19 (2006.01)
G05D 23/00 (2006.01)
G05D 23/32 (2006.01)
F25B 19/00 (2006.01)

(52) U.S. Cl. ........ 165/238; 165/11.1; 165/243; 236/1 R; 62/157; 62/231

(58) Field of Classification Search .................. 165/11.1, 165/201, 238, 239, 243; 236/1 R, 1 B; 62/59, 62/99, 140, 173, 157, 231
See application file for complete search history.

(56) References Cited

U.S. PATENT DOCUMENTS

| | | | |
|---|---|---|---|
| 4,386,649 A | 6/1983 | Hines et al. | |
| 4,389,853 A | 6/1983 | Hile | |
| 4,501,125 A | 2/1985 | Han | |
| 4,543,796 A | 10/1985 | Han et al. | |
| 4,775,944 A | 10/1988 | Nakamura | |
| 4,811,897 A | 3/1989 | Kobayashi et al. | |
| 4,916,909 A * | 4/1990 | Mathur et al. | 62/59 |
| 5,065,585 A | 11/1991 | Wylie et al. | |
| 5,096,156 A | 3/1992 | Wylie et al. | |
| 5,101,639 A * | 4/1992 | Wruck et al. | 236/1 B |
| 5,131,236 A * | 7/1992 | Wruck et al. | 62/173 |
| 5,133,193 A * | 7/1992 | Wruck et al. | 62/99 |
| 5,138,842 A * | 8/1992 | Wruck et al. | 62/140 |
| 5,170,635 A * | 12/1992 | Wruck et al. | 62/140 |
| 5,547,017 A | 8/1996 | Rudd | |
| 5,881,806 A | 3/1999 | Rudd | |
| 5,902,183 A | 5/1999 | D'Souza | |
| 5,924,486 A | 7/1999 | Ehlers et al. | |
| 6,098,893 A | 8/2000 | Berglund et al. | |
| 6,250,382 B1 | 6/2001 | Rayburn et al. | |
| 6,318,096 B1 | 11/2001 | Gross et al. | |

OTHER PUBLICATIONS

David A. Springer et al.; "Development and Testing of an Integrated Residential Night Ventilation Cooling System"; 2004; pp. 1-14.

* cited by examiner

*Primary Examiner* — Ljiljana Ciric
(74) *Attorney, Agent, or Firm* — Oliff & Berridge, PLC

(57) ABSTRACT

A method for nighttime pre-cooling of a building comprising inputting one or more user settings, lowering the indoor temperature reading of the building during nighttime by operating an outside air ventilation system followed, if necessary, by a vapor compression cooling system. The method provides for nighttime pre-cooling of a building that maintains indoor temperatures within a comfort range based on the user input settings, calculated operational settings, and predictions of indoor and outdoor temperature trends for a future period of time such as the next day.

10 Claims, 4 Drawing Sheets

SYSTEM AND METHOD FOR PRE-COOLING OF BUILDINGS

This is a Continuation of application Ser. No. 09/802,883 filed Mar. 12, 2001. The entire disclosure of the prior application is hereby incorporated by reference herein in its entirety.

This invention was made with State of California support under California Energy Commission Contract No. 500-02-026. The Energy Commission has certain rights to this invention.

BACKGROUND OF INVENTION

1. Field of Invention

This invention relates to methods and controls for providing outside air ventilation and vapor compression cooling to commercial and residential buildings, and more specifically, for nighttime pre-cooling of commercial and residential buildings utilizing outside air ventilation and vapor compression cooling.

2. Description of Relevant Art

Utilities and other power providers are striving to reduce electricity use during periods of peak electricity demand because of the high cost of on-peak power and the risk of brown-outs stemming from capacity shortages. Recent studies have predicted an increased rate of power outages in future years based on the inability of power grids to supply increasing power demands. Utility peak capacity shortages are reaching crisis proportions in many areas of the U.S., with utilities resorting to programs for cycling air conditioning equipment off during periods of high peak demand. Methods for reducing power loads are needed to conserve energy and enhance energy independence, as well as to minimize health and safety risks and economic disruptions resulting from power outages. A favorable outcome of the widespread use of ventilation cooling is the reduction of the peak electric load and mitigating the need to construct new power plants.

Summer cooling load is responsible for the greatest share of electricity demand, so methods for reducing this load have economic value and improve electric system reliability. In most summer climates electrical use peaks between about 12 PM and 8 PM. Pre-cooling buildings during the nighttime to a temperature that may be below the normal thermostat setting can be used to shift some or all of the cooling load to off-peak periods. This process involves reducing the temperature of the building mass during morning nighttime hours so that it can absorb heat later in the day thereby maintaining acceptable indoor temperatures with reduced cooling load during the daytime. Conventional methods of nighttime pre-cooling are disclosed in U.S. Pat. No. 5,065,585 issued to Wylie et al. and in U.S. Pat. No. 5,902,183 issued to D'Souza, the subject matter of which are incorporated herein by reference. These systems utilize controllers that measure indoor and outdoor air temperatures and use these measurements to control when the ventilation systems should be operated. Both systems ventilate with outside air when outdoor air temperature is cooler than indoor air temperature by a selected temperature differential, and as long as the indoor air temperature is above a fixed low-limit temperature setting. Conventional thermostats have no provisions for preventing operation specifically during utility peak power use periods or during power shortage alerts. These systems do not provide for optimal reduction of electricity demand during peak afternoon periods. Also, these controls provide no feedback to encourage lower indoor temperature settings that would avert air conditioner use on hot days.

To reduce the electricity demand during periods of peak daytime usage, the pre-cooling process may require the interior space of a building be cooled to a lower temperature than the normal cooling thermostat setting. However, a user will limit this low temperature to maintain an acceptable level of comfort. Pre-cooling can be accomplished by ventilating the space either with cool outdoor air, or with air that is cooled by vapor compression processes. The amount of pre-cooling required to reduce electricity demand during peak afternoon periods depends on current weather conditions.

Optimal pre-cooling requires careful control. Too much pre-cooling uses excessive energy and compromises comfort; too little results in excessive peak period energy use. To achieve the proper balance of pre-cooling utilizing outside air ventilation and pre-cooling utilizing conventional vapor compression cooling requires that the next day's temperature conditions be forecasted in order that the correct amount of pre-cooling can be estimated and subsequently applied. Pre-cooling can be regulated by adjusting the temperature to which the building is pre-cooled, and adjusting the cooling rate for example, by adjusting the volume of air supply during the cooling process. Electronically commutated, variable speed motors (ECM's) allow the airflow during the cooling process to be varied to increase fan efficiency and achieve energy savings during the cooling process.

Conventional methods and control strategies for pre-cooling commercial and residential buildings do not provide for optimal reduction of electricity demand during peak afternoon periods. For instance, conventional methods of setting thermostat schedules are typically performed without considering the use of pre-cooling to reduce electricity consumption during periods of peak usage. Conventional systems that utilize outside air ventilation for pre-cooling typically utilize a simple indoor-outdoor temperature differential control to initiate cooling, and a fixed low limit temperature control to prevent over-cooling. There is a need for improved methods and controls for pre-cooling buildings to minimize the costs of electricity consumption and to reduce electricity demands during periods of peak electricity usage.

SUMMARY OF INVENTION

It is an object of this invention to provide a method of nighttime pre-cooling of a building that reduces energy costs and minimizes energy consumption during periods of peak electric demands.

Another object of the present invention is to provide a method of nighttime pre-cooling of a building that comprises the operation of an outside air ventilation system during a future period that may include a nighttime period and the operation of a vapor compression cooling system, if necessary, after the operation of the outside air ventilation system has been completed.

Another object of this invention is to provide a method of nighttime pre-cooling that utilizes indoor and outdoor temperature predictions.

An additional object of this invention is to provide a method of nighttime pre-cooling that can be controlled by a user input device.

A further object of this invention is to provide a method of nighttime pre-cooling of a building that utilizes a variable speed fan motor to minimize the consumption of energy during the operation of an outside air ventilation system.

The invention utilizes electronic components that include a user input device for use in selecting an indoor low temperature limit and an indoor high temperature limit; and for use in displaying a range of predicted indoor temperatures for a future period. The user input device provides feedback to the user on user-input settings that provide acceptable levels of comfort and optimal energy consumption.

These and other objects and advantages will be apparent to those skilled in the art in light of the following disclosure, claims and accompanying drawings.

BRIEF DESCRIPTION OF THE DRAWINGS

Various exemplary embodiments of the systems and methods of this invention will be described in detail, with reference to the following figures, wherein.

DETAILED DESCRIPTION OF EMBODIMENTS

Embodiments of the present invention provide methods and controls for nighttime pre-cooling of a building. A description of these embodiments is provided with reference to drawing FIGS. 1-5.

Figure 1:
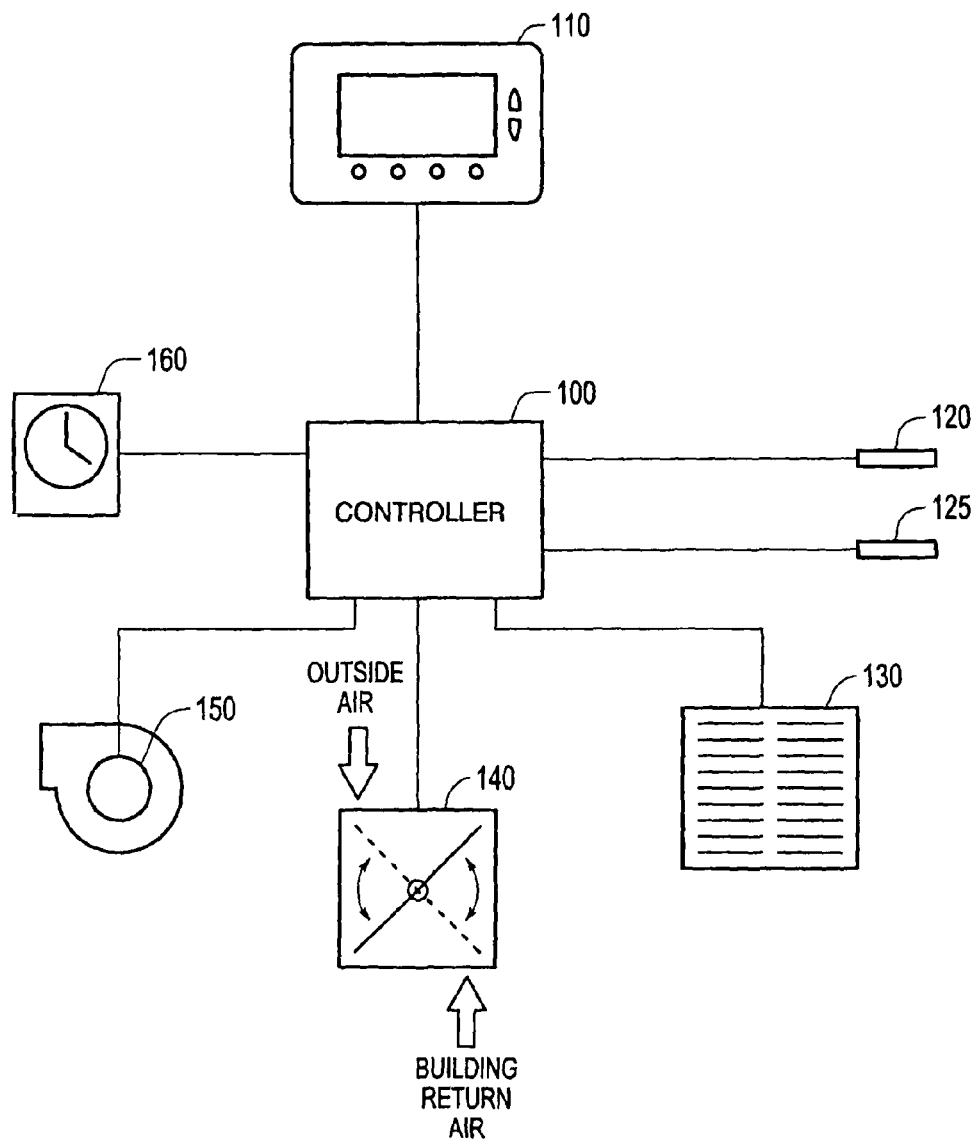
FIG. 1 is a schematic diagram of an exemplary system for pre-cooling a building.

FIG. 1 provides a schematic diagram of an integrated outside air ventilation cooling system and a vapor compression cooling system that may be utilized to practice an embodiment of the present invention. Outside air ventilation cooling systems and vapor compression cooling systems having other configurations known in the art, including integrated systems and separate systems may alternatively be utilized to practice embodiments of the present invention.

Figure 2:
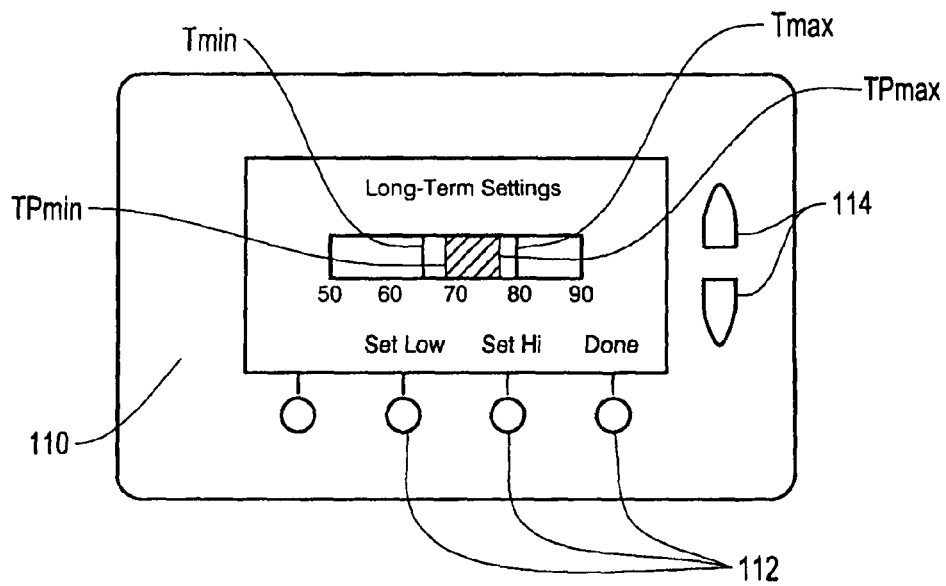
FIG. 2 is a diagram of an input device that be utilized with an embodiment of the present invention, the input device displaying a first set of settings.
Figure 3:
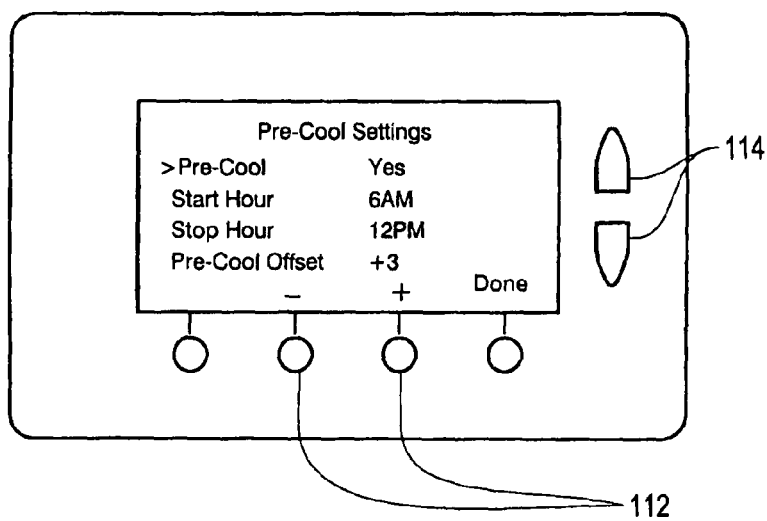
FIG. 3 is another diagram of an input device that may be utilized with an embodiment of the present invention, the input device displaying a second set of settings.

FIG. 2 provides a diagram of an input device, also referred to as a "user interface" or a "wall display unit," that displays a first set of user-selected and operational settings. FIG. 3 provides another diagram of an input device that displays a second set of user-selected and operational settings.

Figure 4:
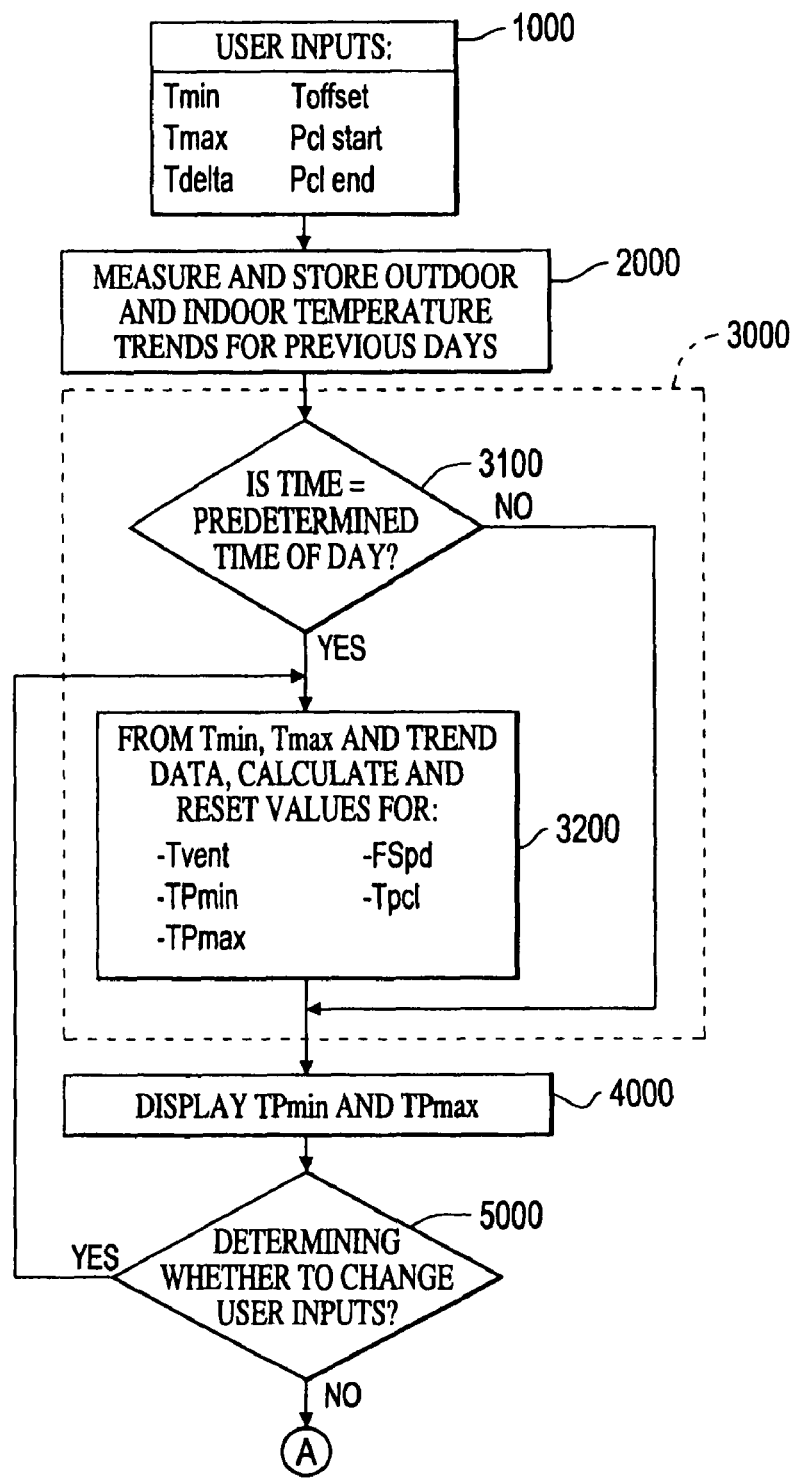
FIGS. 4 and 5 are a flowchart illustrating an exemplary method of pre-cooling a building.
Figure 5:
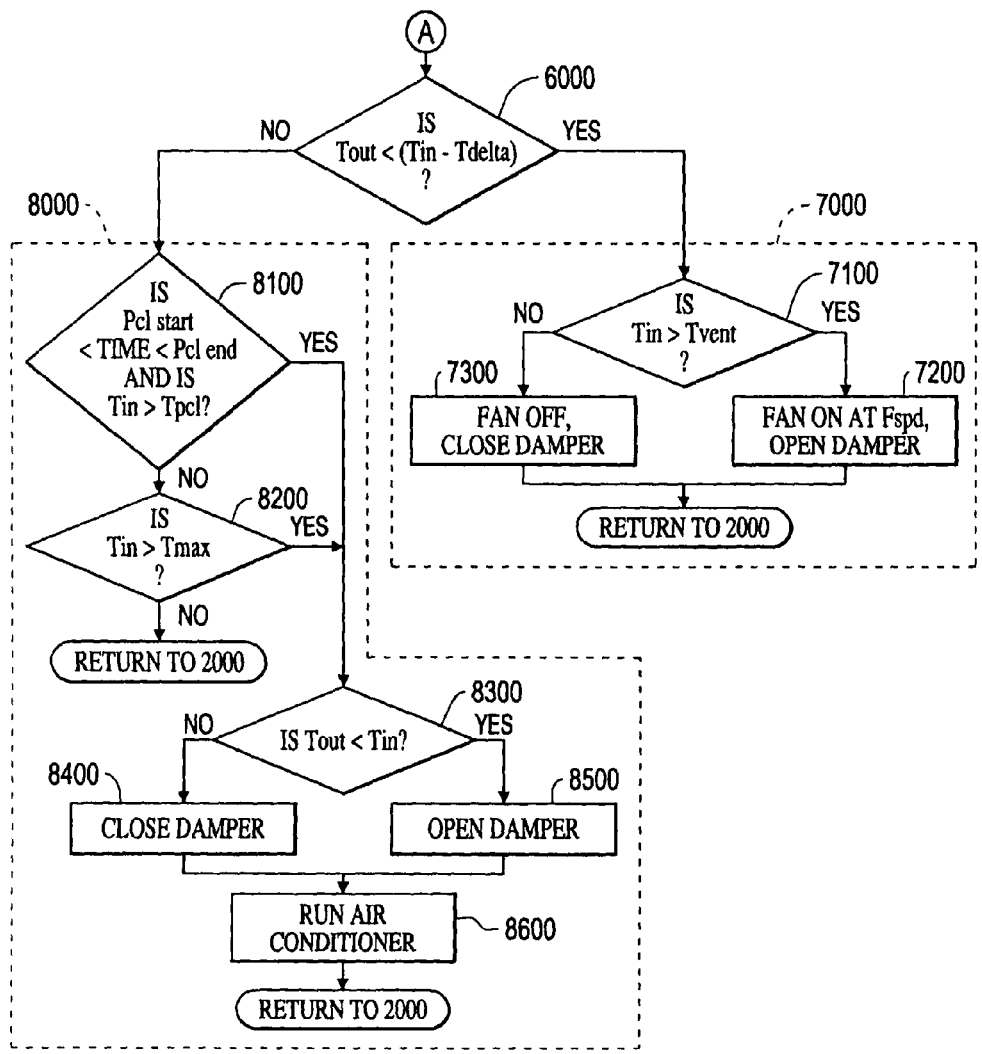

As shown in FIGS. 4 and 5, there is shown an exemplary method of pre-cooling a building comprising the steps of inputting user-selected settings S1000, measuring and storing outdoor and indoor temperature trends for previous days S2000, calculating and resetting operational settings from at least a minimum indoor temperature setting Tmin, a maximum indoor temperature setting Tmax, and the temperature trends S3000, displaying a predicted minimum indoor temperature for the current day TPmin and a predicted maximum indoor temperature for the current day TPmax S4000, determining whether to change user inputs based on the displayed predicted minimum and maximum indoor temperatures for the current day TPmin and TPmax S5000, determining whether a current outside temperature Tout is lower than a current inside temperature Tin by a set amount Tdelta S6000, and ventilating with outside air S7000 or cooling with air conditioning S8000.

The user-selected settings may be inputted by a user S1000 into an input device 110 such as shown, for example, in FIGS. 1-3. The user-selected settings include a minimum indoor temperature setting Tmin, and a maximum indoor temperature setting Tmax which define user-specific limits of indoor temperature levels. The maximum indoor temperature setting Tmax also defines the set point for operating air conditioner cooling.

The user-selected settings may also include an air conditioner pre-cooling on/off setting. This setting indicates whether air conditioner pre-cooling is in an enabled state, and can thus operate as further described below to pre-cool a building, or whether it is in a disabled state. One embodiment of the claimed method provides that if the on/off setting is in a disabled state, the air conditioner will operate only if a current indoor temperature reading Tin exceeds the maximum indoor temperature setting Tmax.

The user-selected settings may also include air conditioner pre-cooling start time setting Pcl start and an air conditioner pre-cooling stop time setting Pcl end. This defines a time period, such as, for example, a portion of a day, in which air conditioner pre-cooling is enabled. An embodiment of the method may include selecting the air conditioner pre-cooling enablement start time setting Pcl start and the air conditioner pre-cooling enablement stop time setting Pcl end so that the air conditioning pre-cooling is enabled during utility off-peak periods and disabled during utility on-peak periods.

An exemplary method of the present invention may also comprise measuring and storing outdoor and indoor temperature trends for previous days S2000. These temperature trends will be used to calculate operational settings and predicted indoor temperature ranges for a future period of time, as further discussed below. This may include measuring and storing indoor temperatures and outdoor temperatures over a preceding period of time, such as over a predetermined number of previous hours or days.

An exemplary method also includes calculating and resetting operational settings and the temperature trends S3000 from one or more user-selected settings, such as but not limited to Tmin and/or Tmax, as well as a combination of temperature trends. The operational settings may include the minimum indoor ventilation cooling temperature setting Tvent, which is the temperature to which indoor air will be cooled by outside air ventilation. In an exemplary embodiment, Tvent is equal to or greater than Tmin.

The operational settings may include a range of predicted indoor temperature for a future period of time such as the current day. The predicted range of indoor temperatures is defined by a predicted minimum indoor temperature TPmin and a predicted maximum indoor temperature TPmax.

The operational settings may further include a cooling fan speed setting FSpd at which a fan 150 having a variable speed motor, such as but not limited to an electronically commutated motor (ECM), is operated during ventilation cooling. The use of a variable speed motor allows the airflow during the cooling process to be operated at a speed setting FSpd selected to minimize energy use, avoid over-cooling, and thereby achieve energy savings and comfort during the ventilation cooling process.

In an exemplary embodiment, calculating and resetting operational settings S3000 may include the step of determining whether to calculate and reset operational settings, such as by determining S3100 if a current time of day TIME equals a predetermined time of day. This may include calculating and resetting the operational settings based on the current time of day. The operational settings could be, for example, calculated and reset on a daily basis at a single predetermined time of day or at multiple times each day at multiple predetermined times.

An exemplary embodiment could further include displaying the predicted minimum TPmin and maximum indoor temperatures TPmax for the current day S4000, and determining whether to change user inputs based on the displayed predicted minimum and maximum indoor temperatures for the current day S5000. This may be done, for example, where the displayed calculated TPmax exceeds the Tmax setting, which predicts air conditioner operation during the future period of time such as the current day. The user may elect to change the user input settings to yield a calculated TPmax that is lower than Tmax and thus predicts that air conditioner operation will not be necessary.

The method may further include determining whether to enable ventilation cooling or air conditioner cooling. In an exemplary method, this includes determining whether a current outside temperature Tout is lower than a current inside temperature Tin by a set amount Tdelta S6000.

The method may include ventilating with outside air S7000 if ventilating and cooling with outside air if a current outside temperature Tout is lower than a current inside temperature Tin by a set amount Tdelta S6000, and if the current indoor air temperature Tin is greater than a calculated ventilation cooling low limit temperature Tvent S7100. If Tin is greater than Tvent, ventilation cooling is operated S7200 and includes opening an outside air damper 140 where ventilation cooling operation is commenced or confirming that the outside air damper 140 is in an "open" position where ventilation cooling is being operated. In this "open" position, outside air is supplied to the fan 150, as shown in FIG. 1. When the damper 140 is in a "closed" position, building return air, or inside air, is supplied to the fan 150. This also includes operating a ventilation cooling fan 150 at a cooling fan speed setting Fspd where ventilation cooling operation is commenced; or, where ventilation cooling is being operated, confirming that the fan 150 is operating at a fan speed setting Fspd. If Tin is not greater than Tvent, then ventilation cooling is not operated 7300 including the steps of closing the outside air damper 140 and turning off a fan 150 where ventilation cooling operation ceases operation, or where ventilation cooling operation is not being operated, confirming that the outside air damper 140 is closed and the fan 150 is not operating.

This method may include cooling with air conditioning pre-cooling S8000 if the current outside temperature Tout is not lower than the current inside temperature Tin by the set amount Tdelta S6000, if a current time of day is within an air conditioner pre-cooling start time setting Tpcl start and an air conditioner pre-cooling stop time setting Tpcl stop, and if the current indoor air temperature Tin is greater than a calculated air conditioner pre-cooling low limit temperature Tpcl S8100. If these conditions are met the air conditioner 130 runs S8600. In embodiments, these conditions for operation of the air conditioner 130 may include if the user-selected air conditioner pre-cooling on/off setting is "on." In embodiments, the air conditioner 130 may also run at any time even if these conditions are not met, similar to the operation of conventional air conditioning control systems, if Tin is greater than Tmax S8200. Thus, in embodiments, cooling with air conditioning S8000 includes determining if TIME is greater than the Pcl start setting and less than the Pcl end setting, and if Tin is greater than the calculated Tpcl S8100, or in some embodiments if Tin is greater than Tmax S8200.

In exemplary embodiments, cooling with air conditioning pre-cooling S8000 may also include determining whether the current outside temperature reading Tout is less than the current indoor temperature reading Tin S8300. If Tout is less than Tin, cooling with air conditioning may further include opening S8500 the damper 140 to deliver cooler outside air; otherwise, cooling with air conditioning may further include closing S8400 the damper 140 to recirculate inside air. It may be appreciated that these steps S8400 and S8500 may comprise confirming that the outside air damper 140 is in an open or closed position, respectively.

As shown in FIG. 1, an exemplary embodiment of a system for pre-cooling a building is provided, comprising a controller 100 that receives an outdoor temperature signal T'out from an outdoor temperature sensor 120; receives an indoor temperature signal T'in from an indoor temperature sensor 125; receives a current time of day signal T'ct from a clock device 160; and receives one or more user-selected setting signals from an input device 110.

FIGS. 2 and 3 provide views of an exemplary embodiment of an input device 110, which may contain the indoor temperature sensor 125. The input device may include a screen that graphically displays long-term settings, such as the predicted indoor temperature range defined by TPmin and TPmax. As shown in FIG. 2, the screen may also display the user's preferred "comfort range" defined by the minimum and maximum indoor temperature settings Tmin and Tmax. As shown in FIG. 3, the screen may alternatively display various pre-cool settings, such as the Pcl start, NI end, Tdelta and Toffset settings. In embodiments, the calculated air conditioner pre-cooling low limit temperature Tpcl is higher than the calculated ventilation cooling low limit temperature Tvent by an offset amount Toffset. The input device 110 may also include one or more buttons 112 and 114 for adjusting control settings and toggling between display screens. The input device 110 may also provide text-based on-screen instructions to the user on demand to explain control functions and facilitate user understandings of the control settings and system operation.

The input device shown in FIG. 2 comprises a display that includes "Set Low" and "Set High" buttons 112. The "Set Low" button allows the user to input a minimum indoor temperature setting Tmin. The "Set Hi" button allows the user to input an indoor high temperature setting Tmax. Using indoor and outdoor temperature data and trends stored from a specific preceding period such as previous days, and statistical equations utilized by the controller 100, the predicted indoor temperature range for a future period of time, such as the next day, is computed and displayed as a "comfort bar." Lowering the minimum indoor temperature setting Tmin will cause the comfort bar display of the predicted indoor temperature range to shift to the left, decreasing the likelihood that air conditioner operation will be needed during a subsequent daytime period of utility on-peak demand. Raising the maximum indoor temperature setting Tmax will have a similar effect. This allows feedback to a user to allow the user to determine whether the new low and high temperature settings TPmin and TPmax will provide for an acceptable range of predicted indoor temperatures and determining whether the settings are likely to cause the air conditioner 130 to run.

The input device shown in FIG. 3 provides a display of various pre-cool settings, and provides an interface to allow a user to input these settings. A user can select one of the settings by scrolling through the list of settings by pressing one of a pair of arrow buttons 114. The selected setting can be changed by pressing either of the buttons 112 corresponding to the plus or minus symbol, and then pressing the button 112 corresponding to the word "Done." The pre-cool setting indicates whether the user intends to utilize nighttime air conditioner pre-cooling and is set as either "yes" or "no." This setting corresponds to the air conditioner pre-cooling enablement on/off setting Pcl. The user can set the period of the day in which pre-cooling may operate by adjusting the start and stop hour settings This corresponds to the user-selected settings of an air conditioner pre-cooling start time setting Pcl start and an air conditioner pre-cooling stop time setting Pcl end. The user may also set the temperature set amount setting Tdelta; ventilation cooling with outside air is enabled when the outside temperature Tout is lower than the indoor temperature Tin by the amount of Tdelta. The user may also select the temperature offset setting Toffset defined by the difference between the calculated ventilation cooling low limit temperature Tvent and calculated air conditioner pre-cooling low limit temperature Tpcl. The use of other embodiments of user interfaces may be utilized to display various information concerning methods of pre-cooling buildings and to allow a user to provide various inputs.

In exemplary embodiments, the controller 100 measures and stores outdoor and indoor temperature trends based on the outdoor and indoor temperature signals T'in and T'out; calculates and resets one or more operational settings based on the user-selected settings and temperature trends; and regulates ventilation cooling and air conditioning pre-cooling. The controller 100 may also control the operation of an outside air damper 140 by selectively opening and closing the damper which may include confirming that the damper 140 is currently in an "open" or "closed" operating position. The controller 100 may also control the operation of fan 150, including selectively turning it on and off and controlling the speed, which includes confirming that the fan 150 is currently in an "on" or "off" operating state. The controller 100 may further calculate and reset the operational settings based on a current time of day, such as for example, each day at a predetermined time of day.

An embodiment of the present invention provides a method of nighttime pre-cooling of a building comprising the steps of sensing an indoor air temperature Tin utilizing an inside temperature sensor 125, sensing an outdoor temperature Tout using an outside temperature sensor 120, selecting an indoor high limit temperature Tmax, selecting an indoor low limit temperature Tmin, and lowering the indoor temperature of the building during a nighttime period by ventilating with outside air. The step of lowering the indoor temperature reading comprises cooling with an outside air ventilation system with the damper 140 in the "open" position to allow for outside air ventilation. This may be followed by the step of cooling with a vapor compression cooling system by operating an air conditioner 130 with the damper 140 in either an "open" position with outside air or "closed" position.

In embodiments, the method provides a method of nighttime pre-cooling of a building further comprising the steps of sensing an outdoor temperature reading utilizing an outside temperature sensor 120 and sensing an indoor temperature Tin using an indoor temperature sensor 125, and storing the indoor and outdoor temperature readings Tin and Tout from the temperature sensors 120 and 125 for a preceding period of time. In the preferred embodiment the preceding period of time is a period of 48 hours; however, it is contemplated that preceding periods of other durations may be utilized. This provides a history of temperature readings that may be utilized in estimating a range of indoor temperatures defined by TPmin and Tpmax for a future period of time.

An embodiment further comprises the step of predicting a range of indoor temperature readings for a future period of time. In the preferred embodiment, the future period of time is one day. This one-day period will encompass both a nighttime period, which in most cases will include the lowest predicted indoor temperature TPmin for the future period, and a daytime period, which in most cases will encompass the highest predicted indoor temperature TPmax for the future period.

In embodiments, the step of calculating and resetting a predicted range of indoor temperatures defined by TPmin and Tpmax employs statistical equations programmed into the controller 100 to predict outdoor and indoor temperatures from previously measured temperatures, and is based on at least the measured and stored temperatures and temperature trends.

In embodiments, a method is provided for predicting next-day weather conditions using statistically derived equations and a recent history of temperature conditions and trends, and the application of these predictions to determine how much pre-cooling to apply. This method is developed using a statistical evaluation of weather patterns and the response of a building to those weather patterns to establish certain key forecasting parameters, and to define equations which, when combined with these key forecasting parameters, can reasonably predict outdoor and indoor temperature extremes at least one day in advance to allow for the selection of optimal indoor temperature limits as well as the timings, durations, and ventilation rates of pre-cooling periods. One benefit of these calculations is employing outside air pre-cooling at an optimal ventilation rate FSpd that minimizes total energy costs.

Another embodiment of the present invention provides a method of nighttime pre-cooling of a building comprising the steps of estimating whether air conditioning of the building during the following daytime period will be required to prevent the highest predicted indoor temperature reading from exceeding the indoor high limit temperature; and indicating on a user interface 110 whether the cooling of the building using air conditioning during the following daytime period is predicted. This indication (not shown) may be provided, for example, by the display of the phrase "A/C WILL RUN" on a user interface or other appropriate indicia.

In an embodiment of the present invention, the outside air ventilation system comprises at least one variable speed fan motor 150, which may be a part of a furnace or other heating-cooling system, and the pre-cooling method comprises the step of controlling the operation of the variable speed fan motor 150 to minimize the consumption of energy during pre-cooling of the building by operation of the outside air ventilation system. In the integrated cooling system shown in FIG. 1, for example, an electronically commutated motor (ECM) 150 powers the blower wheel during operation of both the outside air ventilation cooling system and the vapor compression cooling system. Electronically commutated, variable speed motors allow the airflow during the cooling process to be varied to provide greater ventilation on hotter days and less ventilation on cooler days, thereby achieving energy savings during the ventilation cooling process.

The step of determining a predicted range of indoor temperatures comprises sensing an indoor temperature reading Tin utilizing an indoor temperature sensor 125, sensing an outdoor temperature reading Tout utilizing an outdoor temperature sensor 120, and storing the indoor and outdoor temperature readings for a preceding period of time. These temperature readings can be utilized in estimating the predicted range of indoor temperature readings for a given future period of time such as a portion of the following nighttime period and the entire following daytime period. This allows for identifying a predicted low indoor temperature TPmin for the period, which in most instances is encompassed by the at least a portion of the nighttime period, and identifying a predicted high indoor temperature TPmax for the period, which in most instances is encompassed by the entire following daytime period. This provides a user with feedback to make temperature settings providing the desired balance of comfort and energy costs.

Another embodiment of the present invention provides a controller 100 comprising an output for operating a variable speed ECM fan motor 150 at varying airflow rates. The controller 100 may allow the user to establish maximum fan speed settings for one or more modes of operation. This can be utilized to conserve fan motor energy during operation of the cooling systems. This arrangement also allows the system to be readily adapted to a wide variety of applications and building sizes. Use of a variable speed fan motor in an outside air ventilation cooling system allows outside air ventilation cooling airflow rates FSpd to be varied in proportion to cooling demand. In addition to conserving fan energy, the use of variable speed fan motors also provide the benefits of improved temperature control and minimizing fan noise.

Another embodiment of the present invention provides a method of nighttime pre-cooling of a building comprising determining the optimum schedule for the operation of a vapor compression cooling system during a future period defined by a nighttime period followed by a daytime period. The optimum schedule is selected to maintain the indoor temperature of the building within the range of the comfort zone, i.e., within a range defined by Tmin and Tmax. The optimum schedule is also selected to minimize the cost of electricity utilized by the cooling systems during these periods, with the outside air ventilation system operating at any time during the nighttime period and the vapor compression cooling system operating, if necessary, at any time during the nighttime or the daytime period after the operation of the outside air ventilation cooling system has been completed. Another embodiment may also comprise supplying a rate schedule for the cost of electricity during the future period. In many instances, for example, the cost of electricity is higher during periods of the day when there is peak demand. The rate schedule is used to calculate the estimated costs of operating the cooling systems at different start and stop times Pcl start and Pcl end and for different durations. The method provides for determining an optimum operating schedule for cooling systems of a building that minimizes total electrical costs while reducing the load on electrical grids during periods of peak demand. An embodiment of the invention is a controller 100 that regulates ventilation cooling by 1) measuring outdoor and indoor temperatures Tin and Tout, 2) employing statistical equations programmed into the controller 100 to predict outdoor and indoor temperatures Tout and Tin from previously measured temperatures, and 3) applying predicted temperatures and user temperature settings to control the operation of the cooling systems. The temperature settings include minimum and maximum acceptable indoor temperatures Tmin and Tmax. The controller 100 operates the air conditioner 130, if needed, during early morning hours to pre-cool the building to minimize air conditioner compressor operation during utility peak load periods. The controller 100 schedules the operation of the air conditioner 130 to prevent or minimize use during utility peak demand periods, optionally using current utility price information that may be provided in signals communicated by the local electric utility using a communications link.

The controller 100 may further comprise in an alternate embodiment a communications link used to obtain weather information, including weather predictions, from weather services for control and display purposes. This weather information can be utilized in predicting indoor and outdoor temperatures Tin and Tout for a future period of time.

While this invention is being described in conjunction with the exemplary embodiments outlined above, it is evident that many alternative modifications and variations will be apparent to those skilled in the art. Accordingly, the exemplary embodiments of the invention set forth above are intended to be illustrative, not limiting. Various changes may be made without departing from the spirit and scope of the invention.

What is claimed is:

1. A method of pre-cooling a building, comprising:
ventilating and cooling a building with outside air if a current outside temperature is lower than a current inside temperature by a set amount, and if the current indoor air temperature is greater than a calculated ventilation cooling low limit temperature;
operating a vapor compression air conditioner, if a current time of day is between an air conditioner pre-cooling start time setting and an air conditioner pre-cooling stop time setting, and if the current indoor air temperature is greater than a calculated air conditioner pre-cooling low limit temperature that is greater than the calculated ventilation cooling low limit temperature;
measuring and storing outdoor and indoor temperatures and temperature trends; and
calculating and resetting operational settings based on user settings and indoor and outdoor temperatures and temperature trends, the calculated operational settings including at least fan speed, ventilation cooling low limit temperature and air conditioner pre-cooling low limit temperature.

2. The method as described in claim 1, wherein the calculated operational settings further comprise a predicted minimum indoor temperature for the current day and a predicted maximum indoor temperature for the current day, and the method further comprises displaying the predicted minimum and maximum indoor temperatures for the current day.

3. The method as described in claim 2, further comprising determining whether to change user inputs based on the displayed predicted minimum and maximum indoor temperatures for the current day.

4. The method as described in claim 1, wherein the user settings include a minimum indoor temperature setting, a maximum indoor temperature setting, the air conditioner pre-cooling start time setting, and the air conditioner pre-cooling stop time setting.

5. The method as described in claim 1, further including calculating and resetting the operational settings each day at a predetermined time of day.

6. The method as described in claim 1, wherein the step of ventilating with outside air includes the steps of opening an outside air damper and operating a ventilation cooling fan at a calculated fan speed setting.

7. The method as described in claim 1, wherein the calculated air conditioner pre-cooling low limit temperature is higher than the calculated ventilation cooling low limit temperature by an offset amount.

8. The method as described in claim 1, further including inputting user-selected settings.

9. The method as described in claim 1, further including selecting the air conditioner pre-cooling start time setting and the air conditioner pre-cooling stop time setting so that the air conditioning pre-cooling is enabled during a utility off-peak period and disabled during a utility on-peak period.

10. The method as described in claim 1, further comprising operating a vapor compression air conditioner at any time if the current indoor air temperature is greater than the maximum indoor temperature setting.

* * * * *